United States Patent [19]
Juen

[11] Patent Number: 5,737,015
[45] Date of Patent: Apr. 7, 1998

[54] IMAGING DEVICE EQUIPPED WITH MULTIPLE OUTPUT CHANNEL IMAGING ELEMENT

[75] Inventor: Masahiro Juen, Kanagawa, Japan

[73] Assignee: Nikon Corporation, Tokyo, Japan

[21] Appl. No.: 523,592

[22] Filed: Sep. 5, 1995

Related U.S. Application Data

[63] Continuation of Ser. No. 264,161, Jun. 22, 1994, abandoned.

[30] Foreign Application Priority Data

Jun. 25, 1993 [JP] Japan ................. 5-155683

[51] Int. Cl.$^6$ ............... H04N 5/235; H04N 5/335; H04N 3/14; H04N 5/202
[52] U.S. Cl. ............... 348/230; 348/300; 348/321; 348/677; 348/673; 348/691
[58] Field of Search ............... 348/164, 229, 348/230, 255, 267, 300, 321, 676, 677, 678, 685, 673, 691

[56] References Cited

U.S. PATENT DOCUMENTS

| | | |
|---|---|---|
| 4,314,272 | 2/1982 | Miyaji et al. ............... 348/255 |
| 4,525,741 | 6/1985 | Chahal et al. ............... 348/255 |
| 4,931,864 | 6/1990 | Kawamura et al. ............... 348/675 |
| 5,231,501 | 7/1993 | Sakai ............... 348/255 |
| 5,283,655 | 2/1994 | Usami ............... 348/229 |
| 5,307,158 | 4/1994 | Tsuruta et al. ............... 348/229 |

*Primary Examiner*—Leo Boudreau
*Assistant Examiner*—Bipin Shalwala
*Attorney, Agent, or Firm*—Oliff & Berridge, PLC

[57] ABSTRACT

The direct current voltage level and amplification of a multiple channel output imaging element are adjusted by comparing the output values of each channel. A calculating device, such as, for example, a CPU uses the data of one channel (i.e., a standard channel), which was sampled by a sampling circuit, as a standard, and then takes the difference between this data and the data of the other channels to calculate the offset and amplification differences. The results are sent to a D/A unit, which sends regulating voltages to offset regulating circuits and to amplifying circuits. In this manner, the offsets and amplifications of each channel are adjusted so as to become equal.

39 Claims, 4 Drawing Sheets

IMAGING DEVICE EQUIPPED WITH MULTIPLE OUTPUT CHANNEL IMAGING ELEMENT

This is a Continuation of application Ser. No. 08/264,161 filed Jun. 22, 1994, now abandoned.

BACKGROUND OF THE INVENTION

1. Field of the Invention

The present invention relates to an imaging device that uses an imaging element having multiple output channels, in particular one that is provided with improved adjustments for the offset and the amplification between channels.

2. Description of Related Art

Imaging elements are conventionally used in camera photography. It is necessary to increase the number of elements used in photography in order to increase the resolution of the photographed portrait. However, when the number of elements is increased, it takes longer to output all of the information from the elements. On the other hand, if the output time of each element is accelerated in order to shorten the time for which all of the information are output, noise is easily generated, and the information from the elements may not be recorded and reproduced accurately.

Therefore, imaging devices conventionally use an imaging element equipped with multiple terminals (referred to hereafter as a "photographing element with a multi-channel output") and convert the simultaneously output pixel information into a single image signal using a multiplex-type circuit. With imaging devices of this type, since the photographic pixel information is output through multiple channels, there is no need to increase the output speed of the information from each element, resulting in improved transmission efficiency, with little effect from noise.

With an imaging device that uses this imaging element having a multi-channel output, there is the potential which occurs dispersion (i.e., disparity) in the direct current voltage level or in the amplification amounts between each channel, because the offset adjustment (adjustment of the direct current voltage level of the pixel information) and the amplification adjustment (adjustment of the amplitude amount of the pixel information) are separately performed in each channel. Therefore, with an imaging device that uses this type of imaging element, adjustment of the aforementioned dispersion is performed during construction and prior to shipping, etc.

However, even if a dispersion adjustment is performed prior to the shipping of an imaging device, there are cases in which the direct current voltage level or the amplitude value disperses in each channel because of changes in temperature, changes over time, etc. In these cases, adjustment after the dispersion occurred is not easily accomplished because it is difficult to determine the standard value and to adjust delicately (i.e., slightly).

SUMMARY OF THE INVENTION

It is an object of the present invention to provide an imaging device that can calculate an offset amount to adjust the direct current voltage level and an amplification amount by comparing the value of each channel output and automatically adjusting the direct current voltage level and amplification when a multiple output channel imaging element outputs a photographed image.

In order to achieve the above and other objects, and to overcome the shortcomings detailed above, an imaging device that includes an imaging element having multiple output channels, a direct current voltage regulating circuit that adjusts the direct current voltage of each output channel, and an amplifying circuit that amplifies each output channel is provided with a sampling circuit that extracts the signal on each output channel from the imaging element, and with a calculation device, such as a CPU, that calculates the amount by which to adjust the direct current voltage level (the offset amount) and the amplification (the amplification amount) preferably by comparing the extracted data of each channel extracted by the sampling circuit. In particular, the offset amount and the amplification amount for each channel can be calculated based on a difference between the extracted data of each channel and the extracted data of a preselected one of the channels, also referred to as a standard channel.

The imaging device may also be provided with a first evaluation device that determines whether the data extracted by the sampling circuit agrees with the calculation of the difference, and with a second evaluation device which, when an agreement is determined by the first evaluation device, determines whether the calculated difference agrees with the calculations of the offset amount and the amplification amount. According to this feature, the amount by which to adjust the direct current voltage level and the amplification are calculated when an agreement is detected by the second evaluation device.

The calculation device calculates the amount by which to adjust the direct current voltage level (the offset amount) and the amplification (the amplification amount) by comparing the extracted data of each channel extracted by the sampling circuit. The direct current voltage regulating circuit adjusts the direct current voltage of the output channels, and the amplifying circuit adjusts the amplification of the output channels, based on the calculated result.

BRIEF DESCRIPTION OF THE DRAWINGS

A detailed description of embodiments of the invention will be described with reference to the following drawings in which like reference numerals refer to like elements and wherein.

DETAILED DESCRIPTION OF THE PREFERRED EMBODIMENTS

First Embodiment

Figure 1:
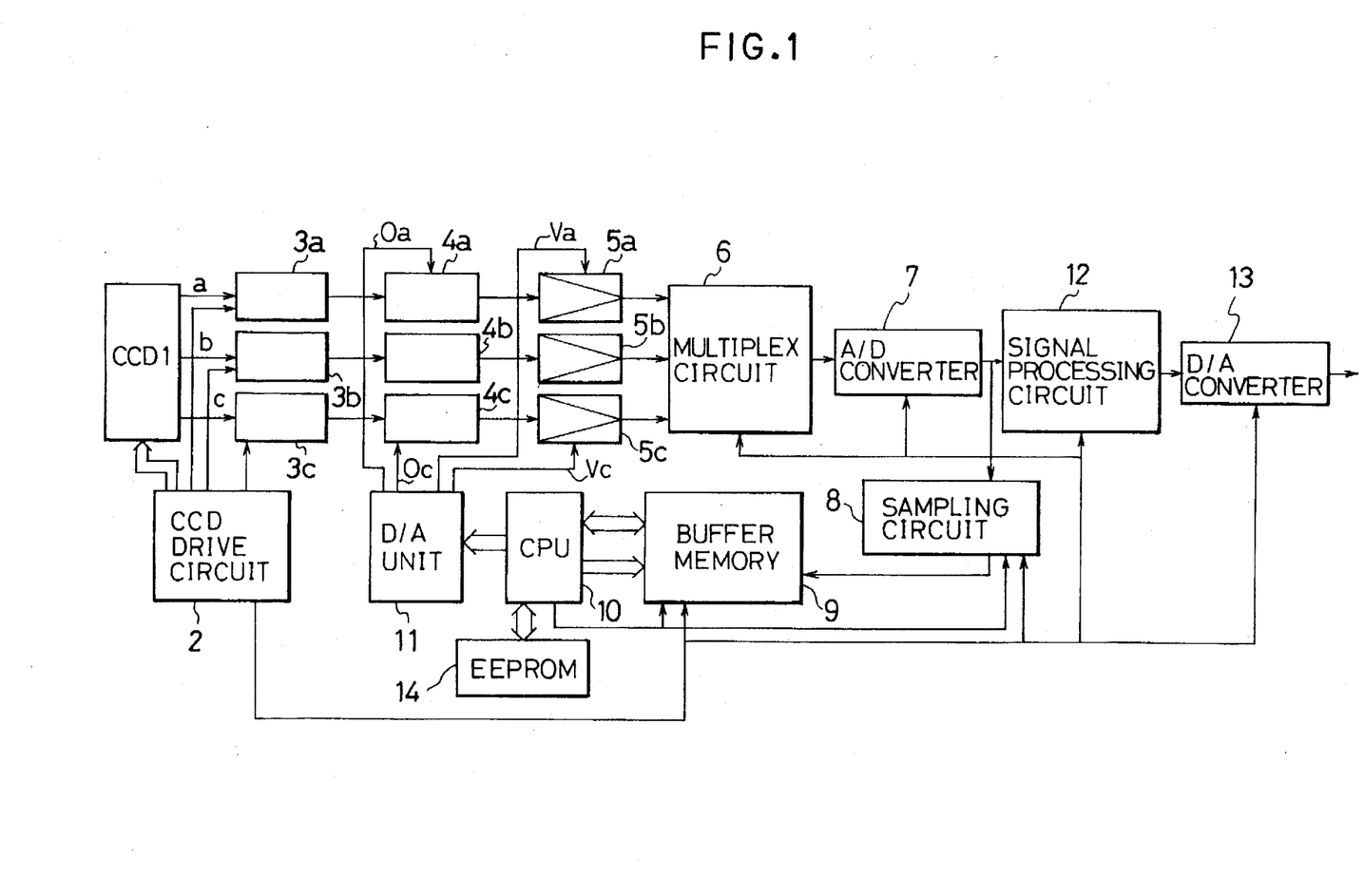
FIG. 1 is a block diagram of a first embodiment of an imaging device according to the present invention.

FIG. 1 is a block diagram that shows a first embodiment of an imaging device according to the present invention. In this embodiment, a CCD (Charge Coupled Device) with a three-channel output is used as the imaging element.

A CCD 1 has a three-channel output and outputs the photographed pixel information through the three output channels a, b, and c. In the embodiment, the output signal of channel b is used as the standard signal, and the imaging device performs the adjustments of the direct current voltage level and the amplification of channels a and c. A CCD driving circuit 2 supplies a clock signal or the like to the CCD 1, which instructs the transmission of the pixel information. The CCD driving circuit 2 also supplies the clock signal to other components of the imaging device as shown in FIG. 1. Noise reduction and sample holding circuits 3a, 3b and 3c eliminate the noise of each pixel information on channels a, b, and c, output from the CCD 1. After eliminating the noise, the circuits 3a, 3b, 3c sample each signal through a commonly known method such as correlated two-fold sampling or the like. Offset regulating circuits 4a, 4b, 4c adjust the direct current voltage in each channel. The circuits 4a, 4b, 4c make adjustments so that the standard direct current voltage level of the pixel information of each channel is the same. The standard voltage level of the offset regulating circuit 4b is adjusted according to a predetermined regulating voltage, and the standard voltage levels of the offset regulating circuits 4a and 4c are adjusted according to regulating voltages Oa and Oc that are input from a D/A unit 11, described hereafter.

Amplifying circuits 5a, 5b, 5c amplify the output of the CCD 1. The amplifying circuit 5b is a gain fixed amplifier that amplifies by means of a predetermined amplification amount. The amplifying circuits 5a and 5c are voltage regulating amplifiers in which the degree of amplification changes according to the value of the regulating voltages Va and Vc supplied from the D/A unit 11, described hereafter. In this manner, the smallest and largest signal values of each channel are adjusted so as to become equal, each the circuit 5a–5c outputting an adjusted pixel information.

A multiplex circuit 6 successively switches the output of each the amplifying circuit 5a, 5b, and 5c and transforms it into a single image signal, which is then output. An A/D converter 7 includes a clock synchronizing with as the transmission of the pixel information from the CCD driving circuit 2. The image signal is transformed into a digital signal by using this clock. A sampling circuit 8 samples a portion of the image signal transformed into a digital signal by the A/D converter 7. The sampled image signal (referred to hereafter as the "sampling data") is stored in a buffer memory 9. This sampling data is used in calculating the amplification difference and the offset difference between channels.

A CPU 10 uses the sampling data stored in the buffer memory 9 to calculate the amplification difference and the offset difference. A D/A unit 11 transforms the amplification difference and offset difference calculated by the CPU 10 into the analog signals and reduces each difference to zero by sending the regulating voltages Oa, Oc, Va, and Vc to the offset regulating circuits 4a and 4c and to the amplifying circuits 5a and 5c. A signal processing circuit 12 manages gamma compensation, profile compensation, and black-white clip and the like, as is well known. A D/A converter 13 transforms the output of the signal processing circuit 12 into an analog image signal. This analog image signal is input to a monitor or similar devices and the photographed image is reproduced and stored.

An electrically erasable programmable ROM 14 (referred to hereafter as an "EEPROM") stores the preset values of the offset difference and the amplification difference in advance. When the power supply is connected, the regulating voltages Oa, Oc, Va, and Vc are set for the offset regulating circuits 4a and 4c and for the amplifying circuits 5a and 5c, respectively, based upon the preset values stored in EEPROM 14.

Below, the operation of the first embodiment is described with reference to FIG. 1.

When the power supply (not shown) of the imaging device is activated, the CPU 10 reads the preset values of the offset difference and amplification difference housed in the EEPROM 14 and sends them to the D/A unit 11. In the D/A unit 11 the values of these differences are transformed into the regulating voltages Oa, Oc, Va, and Vc and sent to each the offset regulating circuit 4a and 4c and the amplifying circuit 5a and 5c.

When the CCD 1 receives the image of the object being photographed, each imaging element in the CCD 1 accumulates a charge, based on the brightness of the image. This accumulated pixel information is output by synchronizing with the clock from the CCD driving circuit 2. The output pixel information passes through the noise reduction and sample holding circuits 3a, 3b, and 3c, is input to the offset regulating circuits 4a, 4b, and 4c, and is adjusted in each channel so that the standard direct current voltage will be the same in each channel. Next, the signal of each channel is amplified in the amplifying circuits 5a, 5b, and 5c so that they will all be the same. The method of the offset adjustment and the method of the amplification will be described hereafter.

After the channel signals that have been amplified in the amplifying circuits 5a, 5b, and 5c have been transformed into a single image signal by the multiplex circuit 6, it is transformed into a digital signal by the A/D converter 7 and sent to the signal processing circuit 12 and to the sampling circuit 8.

In the sampling circuit 8, a portion of the digitized image signal is sampled. However, if the number of samples is too small, the difference of the entire sampling result will not reduce if there is noise present in the pixel information of the sampled portion. Therefore, a number of samples that is sufficient to absorb the influence of any noise is taken, for example, 1024 samples in each channel. Also, when sampling, each channel is sampled simultaneously, selection being made of adjoining locations (i.e., adjoining imaging elements). This is because the data correlation between adjoining locations is strong, and sampling performed under conditions that ensure such correlation makes possible more accurate amplification adjustments and offset adjustments.

Because the primary object being photographed is often located in the central portion of the picture, it is acceptable to take more samplings of the central portion of the picture. On the other hand, if the object being photographed is not limited to the central portion, as in landscape photography, it is acceptable to disperse the samples so that they are taken over the entire picture area. It also is acceptable to provide a switch with which the sampling region can be selected according to the photographic situation.

In this manner, the sampled element signal is stored in the buffer memory 9.

The CPU 10 next calculates the values of the offset difference and the amplification difference by using the sampling data stored in the buffer memory 9, according to the method described below.

In the following description of the operation of the CPU 10, a case is described in which the output is accomplished through n channels and each of channels samples the pixel information of m adjoining imaging elements.

The amount of light input to the imaging element at the kth sampled point for the ith channel is denoted as Xik. The output signal from the imaging element at the kth sampled point for the ith channel is denoted as Yik. The amplification of the ith channel, based on photoelectric transformation characteristics, is denoted as Gi. The offset voltage of the ith channel is denoted as Di. Using these symbols, the output signal Yik is shown by the following expression:

$$Yik = Gi \cdot Xik + Di \qquad (1)$$

If the standard signal output is set at the first channel, the output signal $Y1k$ is expressed as follows:

$$Y1k = G1 \cdot X1k + D1 \qquad (2)$$

Because the photographed image generally has a strong data correlation between each neighboring imaging element, this expression can be assumed to be:

$$Xik = X1k \qquad (3)$$

In this case, the difference between $Yik$ and $Y1k$ is expressed as follows:

$$(Yik - Y1k) = (Gi - G1) \cdot X1k + (Di - D1) \qquad (4)$$

From expressions (2) and (4):

$$(Yik - Y1k) = \{(Gi/G1) - 1\} \cdot Y1k + Di - (Gi/G1) \cdot D1 \qquad (5)$$

In expression (5), if k is varied from 1 to m, $Y1k$ and $Yik-Y1k$ are found for each value of k (i.e., for each imaging element), and $(Gi/G1)-1$ and $Di-(Gi/G1) \cdot D1$ will be found by the least squares method. At this point, if the value of D1 is already known, $Gi/G1$ (the amplification difference) and $Di$ (the offset difference) can be found.

In cases in which the number of channels is great, the error is taken from expressions (4) and (5) because there is a possibility that the assumption made in expression (3) may no longer hold true. In these cases, sampling from adjoining channels as much as possible makes it possible to calculate the differences more accurately. For example, if there are n channels, the error can be made the least possible by letting the standard channel be the n/2th channel, which is positioned in the middle of the line of channels.

Also, concerning all the element information output from the CCD 1, it is not necessary to calculate the differences according to expressions (4) and (5). If the sampling points are selected so that the brightness distribution is uniform, the differences can be calculated accurately even if only a portion of the photographed picture is sampled.

With the first embodiment shown in FIG. 1, the signal on channel b is made to be the standard signal from among the signals on channels a, b, and c. The CPU 10 calculates the amplification difference and offset difference according to expressions (4) and (5) by comparing the sampling data of each of the channels a and c with the sampling data of channel b, and sends the result to the D/A unit 11. In the D/A unit 11, using the offset difference and amplification difference, the regulating voltages Oa, Oc, Va, and Vc are sent to the offset regulating circuits 4a and 4c and to the amplifying circuits 5a and 5c, respectively, so that the offset difference and amplification difference of channels a and c will become zero.

Through the aforementioned management, the offsets and amplifications can be adjusted during intermittent photography.

Figure 2:
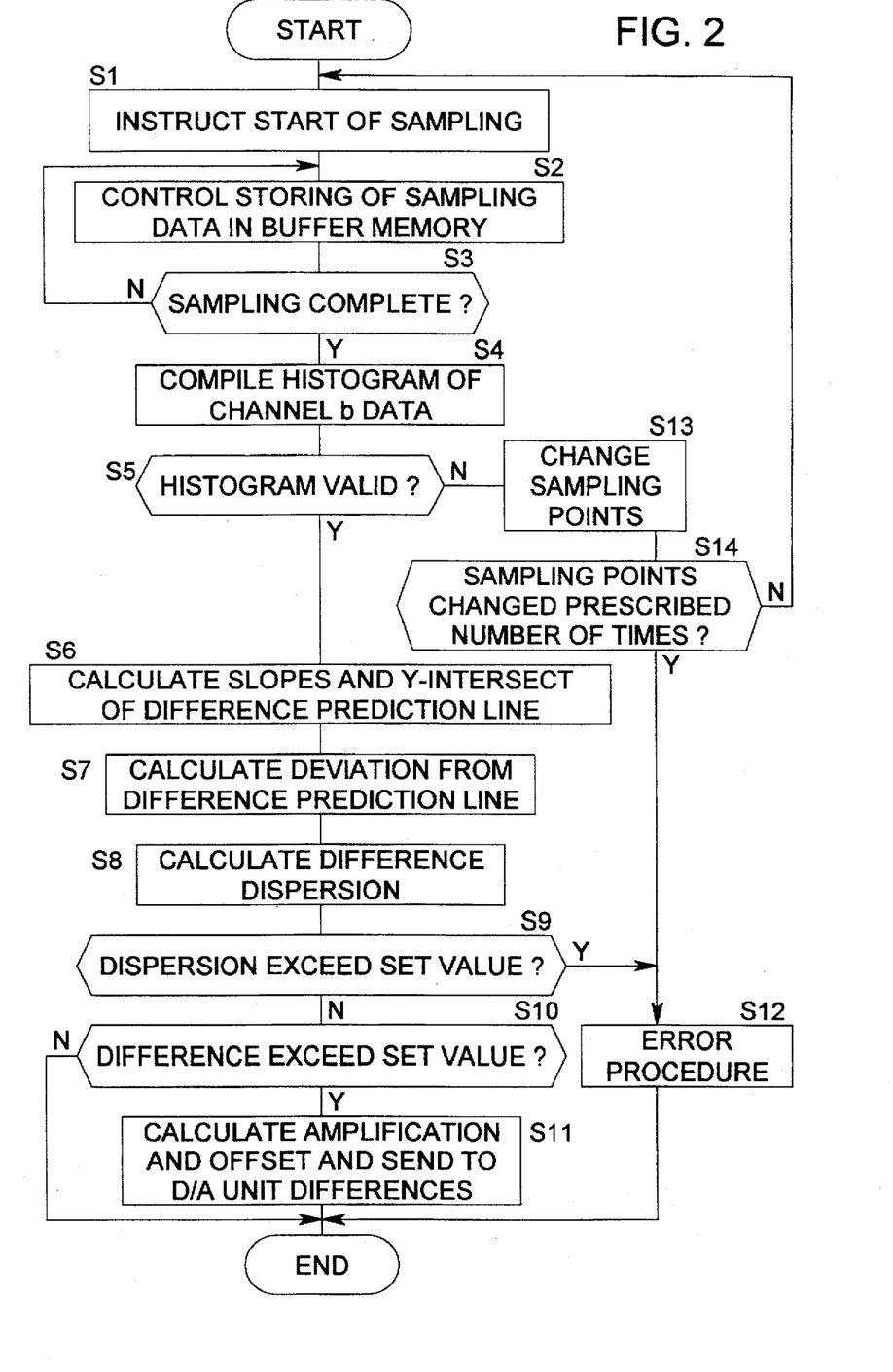
FIG. 2 is a flow chart that shows the operation of the CPU of FIG. 1.

FIG. 2 is a flow chart that shows the operation performed by the CPU 10. The CPU 10 performs the process of this flow separately for each channel. This flow chart begins operation after the CCD 1 has output the photographed pixel information.

In step S1, the CPU 10 instructs the commencement of sampling of pixel information in the sampling circuit 8. In step S2, the CPU 10 controls the data sampled by the sampling circuit 8 (referred to hereafter also as simply "the data") to be stored in the buffer memory 9. In step S3, it is determined whether the necessary number of samplings have been completed. If not, the process returns to step S2. If, on the other hand, it is determined that the necessary number of samplings have been completed, the process moves to step S4. In step S4, the CPU 10 compiles a histogram of the data from channel b (a distribution of the imaging element output values at each imaging element position), and the process proceeds to step S5. In step S5, a determination is made as to whether the compiled histogram is valid. For example, if the imaging element output values of the histogram, or, in other words, the brightness distribution of the photographed image, are concentrated only in specific brightness parameters, such as all black or all white, this data is determined to be invalid because a reliable adjustment cannot be made by using this data to calculate the differences between channels.

In step S6, since the histogram is valid, the CPU 10 varies i and k so that $Yik-Y1k$ are found (in which $Y1k$ corresponds to data for channel b), and plots the data with $Y1k$ as the horizontal axis and $Yik-Y1k$ as the vertical axis. And the CPU 10 finds the slope and Y-intersect of a straight line that passes virtually through the center of the plotted area (referred to hereafter as "the difference prediction line"). The slope and the Y-intersect of the straight line can be found by the least squares method and the like. The difference prediction line will be used to calculate the amplification and offset amounts if certain preconditions, described below, are met. In step S7, the CPU 10 calculates differences between points on the difference prediction line and points on the plot. In step S8, the CPU 10 finds the dispersion of each difference calculated in step S7. The dispersion shows the scatter of points on the plot, and the process moves to step S9. In step S9, a determination is made as to whether the dispersion exceeds a fixed value (i.e., a first preset difference). If the offset adjustment and the amplification adjustment are performed when the value of the dispersion is large, highly reliable adjustments are impossible. Therefore, the CPU 10 performs the procedure of step S9. If it is determined in step S9 that the dispersion does not exceed the fixed value, the process proceeds to step S10, where a determination is made as to whether each difference $(Yik-Y1k)$ in step S6 exceeds a set value (i.e., a second preset difference). If each difference exceeds set values, it is necessary to perform the offset adjustment and the amplification adjustment. Therefore in step S10, the CPU performs the adjustments only when each difference exceeds set values. If it is determined in step S10 that each difference exceeds a set value, the process moves to step S11, in which the CPU 10 calculates the values of the amplification and offset differences from the difference prediction line found in step S6, these values then sending to the D/A unit 11, ending the procedure. If each difference does not exceed the set value in step S10, the procedure ends without calculating the amplification and offset differences.

If the dispersion determined in step S9 is determined to exceed the set value, the process moves to step S12, and the CPU 10 carries out an error procedure (for example, provision of a warning or the like, indicating that a proper adjustment cannot be performed), ending the procedure. In step S5, if the data from the histogram result is determined not to be valid, the process moves to step S13, the CPU 10 changes the sampling points, and the process moves to step S14. In step S14, a determination is made as to whether the changing of sampling points has been carried out a prescribed number of times. If not, the process returns to step S1 and once again recompiles the histogram of the data. Conversely, if the prescribed number of cycles has been reached, the process passes through step S12 to perform the error procedure, and then the procedure ends.

With the procedure described in FIG. 2, the CPU 10 determines by the procedure of step S9 and S10 whether the sampling data agrees with the offset adjustment and with the amplification adjustment. Because the sampling data is only used in cases in which it is determined to agree with preset values, the offset and the amplification are adjusted accurately. If the sampling data is determined to not agree with preset values, readjustment is facilitated because the photographer is warned to the fact that the adjustment is impossible. Also, because the adjustment is performed after the magnitude of the difference between the difference prediction line and each datum is examined and also after the dispersion values of these differences are examined, a highly reliable adjustment is possible. Furthermore, because the photographer is warned that the adjustment will not be performed in cases in which the dispersion value is large, unnecessary adjustments can be avoided, readjustments are facilitated, and the adjustment time is reduced.

It is acceptable to arrange the CPU 10 so as to automatically perform the procedure described in FIG. 2 at fixed intervals by providing a timer or similar means. Alternatively, it may be arranged so as to perform this procedure on command from the photographer. In the case of automatically performing the procedure at fixed intervals, it is acceptable to provide a timer, to cause the timer to operate at times when the offset adjustments and amplification adjustments are performed, and after the time measured by the timer has passed a fixed interval, to reset the timer and repeat the procedure shown in FIG. 2.

Alternately, an arrangement may be accomplished so that the adjustments are performed at fixed intervals, when the main switch of the camera is on.

When photography is performed by the first embodiment in this manner, using a CCD with a three-channel output a, b, and c, because channel b is used as the standard, and the offset differences and amplification differences of the other channels are found and the offset adjustments and amplification adjustments are performed according to the size of those differences, even if the offset and amplification of each channel changes due to a timing change or the like, they can still be automatically adjusted to coincide with channel b. Also, because the amplifications and offsets are adjusted during photography, no special effort is required for the adjustments and it becomes possible to continually make the most appropriate adjustments of the offsets and amplification.

With the embodiment described above, channel b is designated as the standard by which differences in the other channels are detected, but the signal output used as the standard also may be designated as channel a or c.

Second Embodiment

Figure 3:
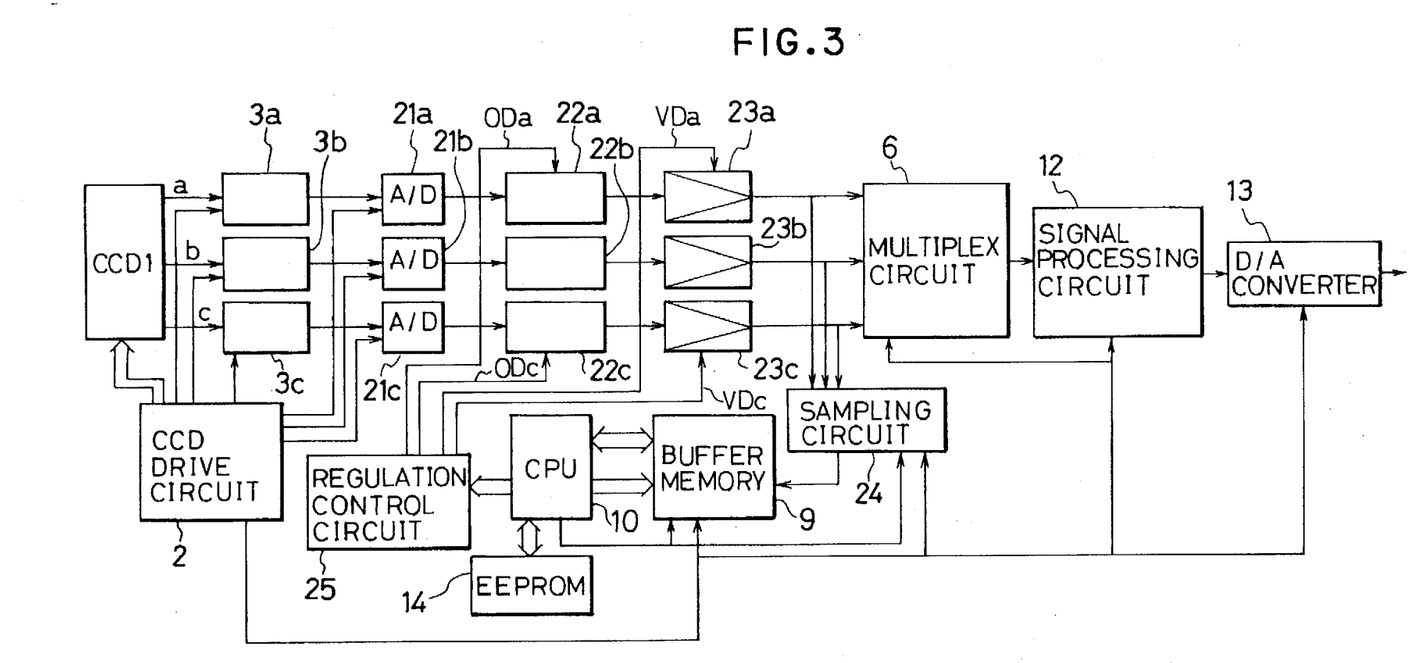
FIG. 3 is a block diagram of a second embodiment of an imaging device according to the present invention.

With the first embodiment, the offset adjustments and amplification adjustments are performed as analog signals. In contrast, with the second embodiment described below, the offset adjustments and amplification adjustments are performed after the output of CCD 1 is converted into digital signals. FIG. 3 is a block diagram that shows the second embodiment. Elements that are common to the first embodiment shown in FIG. 1 have the same reference symbols; hence their description is omitted.

A/D converters 21a, 21b, 21c transform the output from the noise reduction and sample holding circuits 3a, 3b, and 3c into digital signals, based on a clock input from the CCD driving circuit 2 that synchronizes with the imaging pixel information transmission. Offset regulating circuits 22a, 22b, 22c adjust these signals so that the value of the digital signals corresponding to the standard direct current voltage of each channel all become equal. The standard voltage level of the offset regulating circuit 22b is adjusted by a predetermined regulating digital signal, and the standard voltage levels of the offset regulating circuits 22a and 22c are adjusted by the regulating digital signals ODa and ODc, which are input from the regulating control circuit 25, which will be described hereafter. Amplifying circuits 23a, 23b, 23c amplify the digital signal from each channel. The amplifying circuit 23b is a gain fixed amplifier that amplifies the digital signal from channel b by a predetermined amplification. The amplifying circuits 23a and 23c are gain changeable amplifiers in which the degree of amplification changes, based on the regulating signals VDa and VDc, which have been input from the regulating control circuit 25. Through these circuits, the digital signals corresponding to the largest and smallest values of each channel are adjusted so as to become equal. A sampling circuit 24 samples the digital data of each channel from the amplifying circuits 23a, 23b, and 23c and stores these sampling datas in the buffer memory 9. A regulating control circuit 25 uses the amplification differences and offset differences calculated by the CPU 10 to send the regulating digital signals ODa, ODc, VDa, and VDc to the offset regulating circuits 22a and 22c and to the amplifying circuits 23a and 23c, in order to make each difference become zero.

When describing the operation of the second embodiment with reference to FIG. 3, the imaging pixel information photographed by the CCD 1 is transformed into a digital signal by the A/D converters 21a, 21b, and 21c after noise elimination and sampling have been performed by the noise reduction and sample holding circuits 3a, 3b, and 3c. After the offsets of the digitized pixel information has been adjusted by the offset regulating circuits 22a, 22b, and 22c, the amplifications are adjusted by the amplifying circuits 23a, 23b, and 23c, the signals amplified by the amplifying circuits 23a, 23b, and 23c being sent to the multiplex circuit 6 and to the sampling circuit 24.

In the sampling circuit 24, a portion of each element signal is sampled and the results are stored in the buffer memory 9. The CPU 10 uses the digital signals stored in the buffer memory 9 and calculates the offset differences and amplification differences in the same way as with the first embodiment. The calculated offset differences and amplification differences are sent to the regulating control circuit 25. In the regulating control circuit 25, the regulating digital signals ODa, ODc, VDa, and VDc are sent to the offset regulating circuits 22a, 22c, and to the amplifying circuits 23a and 23c, respectively, using the amplification differences and offset differences from the CPU 10, so that the offset differences and amplification differences of channels a and c will become zero.

In this manner, because the offset adjustments and amplification adjustments in the second embodiment are performed after being transformed into digital signals, the adjustments have little potential to be influenced by noise. Also, because the offset adjustments and amplification adjustments are performed digitally by the regulating digital signals ODa, ODc, VDa, and VDc, adjustment errors are minimized.

With the second embodiment described above, the sampling circuit 24 samples using the output from each the amplifying circuit 23a, 23b, and 23c, but, as in the first embodiment, it also is acceptable to sample the output of the multiplex circuit 6 and then to distribute the sampled datas to each channel.

Third Embodiment

The first and second embodiments each equip with a CPU inside the imaging device. Because the offset differences and amplification differences are calculated by the CPU, these embodiments have the advantage of being able to make the offset and amplification adjustments during photography. However, in general, if the offsets and gains are adjusted once, differences in the offsets and gains do not occur frequently; therefore, frequent adjustment may not be required thereafter. Therefore, in the third embodiment, the sampling circuit, the buffer memory, and the CPU are provided on the exterior of the imaging device.

Figure 4:
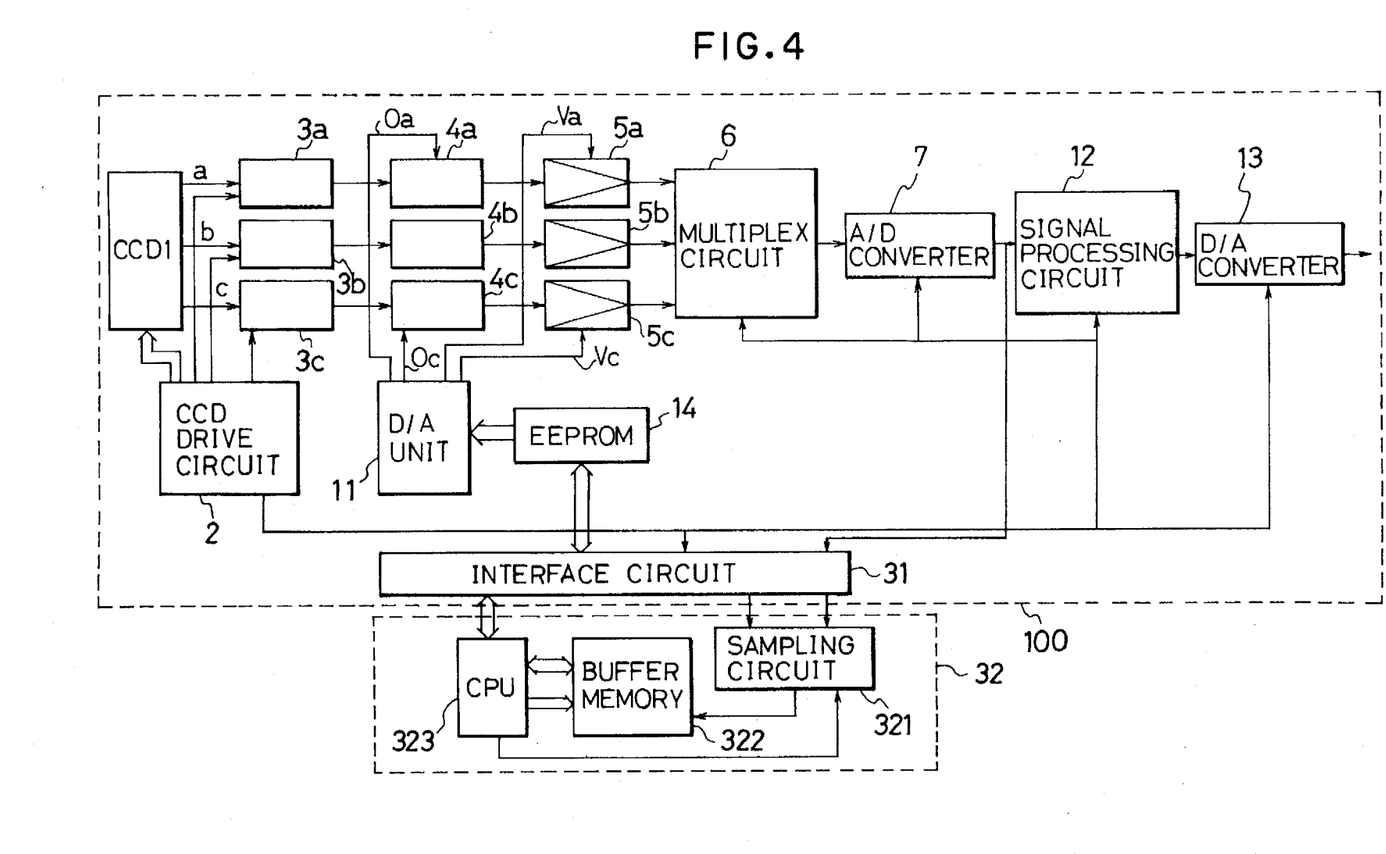
FIG. 4 is a block diagram of a third embodiment of an imaging device according to the present invention.

FIG. 4 is a block diagram that shows the third embodiment. Elements that are common to the first and second embodiments have the same reference symbols; hence their description is omitted.

An interface circuit 31 transmits information between the imaging device 100 and the externally attached an adjustment device 32. This adjustment device 32 comprises a sampling circuit 321, a buffer memory 322, and a CPU 323. In other words, the third embodiment contains no sampling circuit, buffer memory, or CPU within the imaging device 100, the offset and amplification adjustments being made the same as with the first and second embodiments by being connected to the adjustment device 32 through the interface circuit 31.

The third embodiment is described hereafter, with reference to FIG. 4. In the initial set up of the imaging device 100, after the adjustment device 32 is connected to the imaging device 100, the photographic object is photographed by the CCD 1. The photographed element signal passes through the noise reduction and sample holding circuits 3a, 3b, and 3c, the offset regulating circuits 4a, 4b, and 4c, the amplifying circuits 5a, 5b, and 5c, the multiplex circuit 6 and through the A/D converter 7, and is transformed into a digital signal. The digital signal from the A/D converter 7 is sent to the adjustment device 32 through the interface circuit 31. In the adjustment device 32, according to the instruction of the CPU 323, a portion of the photographed image is sampled by the sampling circuit 321 and housed in the buffer memory 322, the offset differences and amplification differences being calculated in the same manner as with the first and second embodiments, using the stored sampling data, and the calculated offset differences and amplification differences that are stored in the EEPROM 14 through the interface circuit 31. After this procedure, the adjustment device 32 is removed from the imaging device 100.

Under normal operating conditions of the imaging device 100, the offset differences and amplification differences stored in the EEPROM 14 are automatically sent to the D/A unit 11 when the power supply (not shown) is connected to the imaging device 100. After the differences have been transformed to the regulating voltages Oa, Oc, Va, and Vc by the D/A unit 11, they are sent to each of the offset regulating circuit 4a and 4c and to each of the amplifying circuit 5a and 5c, where the offset adjustments and the amplification adjustments are performed.

In the third embodiment, because the adjustment device 32 is attached to the exterior of the imaging device 100 in this manner, the construction of the imaging device 100 can be simplified, thereby enabling a reduction in cost. Also, because the adjustment device 32 may be easily attached to and removed from the imaging device 100, and because adjustments may be carried out the same as with the first and second embodiments when the adjustment device 32 is attached, there is no adjustment inconvenience. Thus, in cases in which only an initial adjustment of the imaging device 100 is performed, the third embodiment may be used.

With the third embodiment described above, the offset adjustments, etc. are carried out as analog data in the same manner as in the first embodiment, but it is also possible to perform these adjustments after converting to digital data, as in the second embodiment.

In the embodiments described above, the amplification adjustments are performed after the offset adjustments are performed, but it also is possible to perform the offset adjustments after the amplification adjustments are performed.

Also, in the embodiments described above, a case was described in which a CCD with a three-channel output was used as the photographic element; however, the photographic element is not limited to a CCD. Any type of photographic element may be used, such as a MOS-style photographic element or a CCD and MOS combination-style photographic element. Furthermore, the number of channel outputs may be any number greater than two, and is not limited to three channels. However, if the number of channels is great, the difference may increase because the distance from the standard channel increases, as described above. Therefore, in this case, it is acceptable to successively change the base channel (i.e., the standard channel) and detect the differences.

With the illustrated embodiments the CCD 1 functions as an imaging means, the offset regulating circuits 4a, 4b, and 4c function as a direct current voltage regulating means, the amplifying circuits 5a, 5b, and 5c function as an amplifying means, the sampling circuit 8 functions as an extraction means, and the CPU 10 functions as a calculation means, the first evaluation means, and also as the second evaluation means.

As described in detail above, an accurate adjustment becomes possible and adjustment automation is promoted by the described embodiments because the output of each channel from an imaging element such as a CCD or similar means is extracted, and the amounts required to adjust the direct current voltage levels and the amplifications are calculated by comparing the extracted data against each other. Also, because the adjustments are performed during intermittent photography, no special effort on the part of the photographer is needed for the adjustments. In addition, because adjustments are promptly made, even if photographic conditions change, such as through a change in temperature, etc., photography may always be performed at the optimal conditions.

Because the direct voltage level adjustments and the amplification adjustments are performed based on the difference between the extracted data of a set channel and the extracted data of the other channels, the adjustment procedure is simplified.

Also, because a first evaluation means is provided that determines whether the extracted data agrees with the calculation of the difference, and the system is arranged so that the difference is calculated by the calculation means only when an agreement is determined to exist, more accurate adjustment becomes possible. Furthermore, because a second evaluation means is provided which determines whether the calculated difference agrees with the calculations of the offset amount and the amplification amount, and it is arranged so that calculation of the offset amount and of the amplification amount are performed only when an agreement is determined, a highly reliable adjustment becomes possible, in addition to which unnecessary adjustments can be eliminated.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An imaging device comprising:
    imaging means for converting a light image to an electric signal output, said imaging means having multiple output channels;
    direct current voltage regulating means for adjusting a direct current voltage level of a signal on each output channel from said imaging means;
    amplifying means for amplifying the signal on each output channel from said imaging means;
    extracting means for extracting data from at least a portion of the signal data on each output channel from said imaging means;
    reliability determining means for determining whether a reliability of said extracted data exceeded a predetermined value based on a distribution of said extracted data without a fixed reference standard;
    calculation means for calculating an offset amount and an amplification amount based on data of each output channel, said calculation means calculating said offset amount and amplifying amount when said reliability determining means determines that said reliability of the data of each output channel exceeds said predetermined value;
    said direct current voltage regulating means adjusting said direct current voltage level of the signal on each output channel based on the offset amount calculated by said calculation means; and
    said amplifying means amplifying the signal on each output channel based on the amplification amount calculated by said calculation means.

2. The device of claim 1, wherein said calculation means includes difference calculating means for calculating a difference between the data extracted from a prescribed one of said multiple output channels and the data extracted from remaining ones of said multiple output channels, wherein said calculation means calculates said offset amount and said the amplification amount based on said difference.

3. The device of claim 2, wherein said calculation means only calculates said offset amount and said amplification amount for said remaining ones of said multiple output channels.

4. The device of claim 2, wherein said reliability determining means includes:
    first evaluation means for determining whether data differences of the data extracted by said extracting means is less than a first preset difference so that the extracted data is suitable for the calculation of said difference in said calculating means; and
    second evaluation means for determining whether said difference calculated by said calculating means is greater than a second preset difference and that said difference is suitable for the calculations of said offset amount and said amplification amount, said second evaluation means making determination, when said first evaluation means determines that said extracted data is suitable, and wherein:
    said calculation means calculates said offset amount and said amplification amount when said first and second evaluation means determine that said extracted data extracted by said extracting means and said difference calculated by said calculating means are suitable.

5. The device of claim 1, further comprising:
    time measuring means for measuring passage of a prescribed time period, said calculation means calculating said offset amount and said amplification amount each time the prescribed time period expires.

6. The device of claim 2, further comprising:
    time measuring means for measuring passage of a prescribed time period, said calculation means calculating said offset amount and said amplification amount each time the prescribed time period expires.

7. The device of claim 4, further comprising:
    time measuring means for measuring passage of a prescribed time period, said calculation means calculating said offset amount and said amplification amount each time the prescribed time period expires.

8. The device of claim 1, wherein said calculation means and said extracting means are located in a first housing separate from a second housing containing said imaging means, said direct current voltage regulating means, and said amplifying means.

9. The device of claim 8, wherein said second housing includes interface means for performing communication between said first housing and said second housing.

10. The device of claim 1, wherein the signal output by said imaging means is an analog signal, and wherein said direct current voltage regulating means and said amplifying means act upon the analog signal.

11. The device of claim 10, further comprising analog-to-digital converting means for converting the analog signal output by said direct current voltage regulating means and said amplifying means into a digital signal, and wherein said extracting means acts upon the digital signal.

12. The device of claim 1, wherein the signal output by said imaging means is an analog signal, and further comprising analog-to-digital converting means for converting said analog signal to a digital signal, said direct current voltage regulating means and said amplifying means acting upon the digital signal.

13. The device of claim 2, wherein said prescribed one of said channels is a channel located near a center of said imaging means.

14. An imaging device comprising:
    an imaging element having multiple output channels on which a pixel information is output;
    a voltage regulating circuit and an amplifying circuit that convert said pixel information to adjusted signals;
    a sampling circuit that receives said adjusted signals and outputs sampling data;
    a reliability determining circuit that determines whether a reliability of said sampling data exceeds a predetermined value based on a distribution of said sampling data without a fixed reference standard; and
    a calculation device that calculates an offset amount and an amplification amount based on said sampling data, said calculation device caluculating said offset amount and said amplifying amount when said reliability determining circuit determines that said reliability of said sampling data exceeds said predetermined value, said calculation device coupled to said voltage regulating circuit to supply said offset amount to said voltage regulating circuit, said calculation device coupled to said amplifying circuit to supply said amplifying circuit with said amplification amount, said voltage regulating circuit adjusting said voltage level of said pixel information based on said offset amount, and said amplifying circuit amplifying said pixel information based on said amplification amount.

15. The device of claim 14, wherein said sampling circuit outputs said sampling data for each of said channels, and said calculation device determines said offset amount and said amplification amount by comparing said sampling data of each channel.

16. The device of claim 15, wherein one of said multiple output channels is a standard channel, and said calculation device compares the sampling data of said standard channel to the sampling data of remaining channels to determine said offset amount and said amplification amount.

17. The device of claim 16, wherein said calculation device calculates a difference between the sampling data of said standard channel and the sampling data of the remaining channels to determine said offset amount and said amplification amount.

18. The device of claim 14, wherein said imaging element is a charge coupled device.

19. The device of claim 14, wherein said voltage regulating circuit and said amplifying circuit include a stage for each of said multiple output channels.

20. The device of claim 14, wherein said calculation device includes a microprocessor.

21. The device of claim 14, further comprising a buffer memory coupled to said sampling circuit and to said calculating device, said sampling data stored in said buffer memory.

22. The device of claim 14, wherein said calculation device and said sampling circuit are located in a first housing separate from a second housing containing said imaging element, said voltage regulating circuit, and said amplifying circuit.

23. The device of claim 22, wherein said second housing includes an interface circuit that performs communication between said first housing and said second housing.

24. The device of claim 14, wherein the pixel information output by said imaging element is an analog signal, and wherein said voltage regulating circuit and said amplifying circuit act upon the analog signal, said adjusted signal being the analog signal.

25. The device of claim 24, further comprising an analog-to-digital converter that converts the analog adjusted signal into a digital signal, and wherein said sampling circuit acts upon the digital signal.

26. The device of claim 14, wherein the pixel information output by said imaging element is an analog signal, and further comprising an analog-to-digital converter that converts said analog image signal to a digital image signal, said voltage regulating circuit and said amplifying circuit acting upon the digital signal to output said adjusted signal as the digital signal.

27. The device of claim 16, wherein said standard channel is a channel located near a center of said imaging element.

28. A method of adjusting an image signal output by an imaging device including an imaging element having multiple output channels on which the pixel information is output, a voltage regulating circuit and an amplifying circuit coupled to said multiple output channels, which convert said image signal to an adjusted signal, said method comprising:

sampling said adjusted signal using a sampling circuit to produce sampling data;

determining whether data differences of said sampling data is less than a preset difference so that said sampling data is suitable for calculating an offset amount to adjust said direct current voltage level and calculating an amplification amount to amplify the pixel information without a fixed reference standard;

calculating said offset amount and said amplification amount based on said sampling data using a calculating device when said sampling data is determined to be suitable for said calculations; and using said offset amount with said voltage regulating circuit to adjust the voltage level of said pixel information, and using said amplification amount with said amplifying circuit to amplify said pixel information.

29. The method of claim 28, wherein said voltage is a direct current voltage, and said voltage regulating circuit is a direct current voltage regulating circuit.

30. The method of claim 28, said calculating includes:

designating one of said channels as a standard channel;

determining a difference between said sampling data of said standard channel and said sampling data of remaining ones of said channels; and calculating said offset amount and said amplification amount from said difference.

31. The method of claim 30, wherein said offset amount and said amplification amount are calculated based on a difference prediction line that is formed by plotting said difference using said sampling data of said standard channel.

32. The method of claim 30, wherein said calculating includes:

determining whether said data differences of said sampling data is less than a first preset difference so that said sampling data is suitable for a calculation of said difference; and when said sampling data is suitable for the calculation of said difference, determining whether the difference between said sampling data of said standard channel and said sampling data of the remaining ones of said channels is greater than a second preset difference so that said sampling data is suitable for the calculations of the offset amount and the amplification amount, and wherein:

said offset amount and said amplification amount are calculated only when said sampling data and said difference are suitable.

33. The method of claim 28, further comprising:

measuring passage of a prescribed time period, said offset amount and said amplification amount being calculated each time the prescribed time period expires.

34. An imaging device comprising:

an imaging sensor having a first output channel outputting a first signal data and a second output channel outputting a second signal data, said first and second output channels outputting said first and second signal data as electric signals;

a voltage regulating circuit adjusting a direct current voltage level of said electric signals;

an amplifying circuit amplifying said electric signals;

a sampling circuit simultaneously selecting a first sampling data and a second sampling data; said first sampling data being selected from at least a portion of said first signal data and said second sampling data being selected from at least a portion of said second signal data, said first and second sampling data corresponding to image signals from adjoining image elements;

a calculation device calculating an offset amount and an amplification amount based on said first and second sampling data without a fixed reference standard, said calculation device supplying said offset amount to said voltage regulating circuit and supplying said amplification amount to said amplifying circuit, said voltage regulating circuit adjusting said direct current voltage level of said electric signals based on said offset amount and said amplifying circuit amplifying said electric signals based on said amplification amount.

35. The device of claim 34, further comprising:

a reliability determining circuit which determines whether a reliability of said first and second sampling data exceeds a predetermined value based on a histogram of said first sampling data, wherein said calculation device calculates said offset amount and said amplification amount when said reliability of said first and second sampling data exceeds said predetermined value.

36. The device of claim 35, wherein said reliability determining circuit further includes a differences calculator which calculates differences between said first and second sampling data, said reliability determining circuit determining said reliability of said first and second sampling data based on said differences.

37. An imaging device comprising:

imaging means for converting a light image to an electric signal output, said imaging means having multiple output channels;

direct current voltage regulating means for adjusting a direct current voltage level of a signal on each output channel from said imaging means;

amplifying means for amplifying the signal on each output channel from said imaging means;

extracting means for extracting data from at least a portion of the signal data on each output channel from said imaging means for a purpose of using the extracted data for calculation of an offset amount and an amplifying amount;

reliability determining means for determining whether said extracted data is reliable based on at least one of a distribution of said extracted data and a dispersion of differences between said extracted data and reference data without a fixed reference standard, said reliability determining means determining that said extracted data is reliable when said distribution of said extracted data exceeds a first predetermined value, and said reliability determining means determining that said extracted data is reliable when said dispersion of said difference between said extracted data and said reference data is within a second predetermined value;

calculation means for calculating said offset amount and said amplifying amount based on the extracted data of each output channel, said calculation means calculating said offset amount and said amplifying amount only when said reliability determining means determines that said extracted data is reliable;

said direct current voltage regulating means adjusting said direct current voltage level of the signal on each output channel based on the offset amount calculated by said calculation means; and said amplifying means amplifying the signal on each output channel based on the amplifying amount calculated by said calculation means.

38. The device of claim 37, wherein said calculation means includes difference calculating means for calculating said differences between the data extracted from a prescribed one of said multiple output channels as said reference data and the data extracted from remaining ones of said multiple output channels, wherein said calculation means calculates said offset amount and the amplifying amount based on said differences.

39. The device of claim 37, wherein said reliability determining means determines based on a histogram of said extracted data whether said extracted data is reliable.

* * * * *